(12) United States Patent
Dorn et al.

(10) Patent No.: US 8,991,140 B2
(45) Date of Patent: Mar. 31, 2015

(54) HARVEST AID MACHINE

(75) Inventors: Nathan Dorn, Salinas, CA (US); Gary Grossen, Gervais, OR (US); Michael Christensen, Camarillo, CA (US)

(73) Assignee: Reiter Affilated Companies, LLC, Oxnard, CA (US)

( * ) Notice: Subject to any disclaimer, the term of this patent is extended or adjusted under 35 U.S.C. 154(b) by 639 days.

(21) Appl. No.: 12/950,745

(22) Filed: Nov. 19, 2010

(65) Prior Publication Data
US 2011/0099965 A1 May 5, 2011

Related U.S. Application Data

(63) Continuation-in-part of application No. 12/813,725, filed on Jun. 11, 2010, now Pat. No. 8,689,527.

(60) Provisional application No. 61/186,677, filed on Jun. 12, 2009.

(51) Int. Cl.
*B65B 25/04* (2006.01)
*B65B 67/02* (2006.01)
(Continued)

(52) U.S. Cl.
CPC .............. *A01D 46/20* (2013.01); *B65B 25/046* (2013.01); *A01D 46/243* (2013.01); *A01B 75/00* (2013.01); *A01D 45/001* (2013.01); *B65B 67/02* (2013.01); *A01D 46/00* (2013.01)
USPC ............ 53/391; 280/32.5; 280/209; 280/215; 414/508

(58) Field of Classification Search
CPC ... A01D 45/001; A01D 46/00; A01D 46/243; A01D 46/20; B65B 25/046; B65B 67/02; B65B 67/00; B65B 25/04; A01B 75/00
USPC ............ 53/390, 391; 414/508; 280/32.5, 209, 280/215
IPC ............ B65B 67/00; A01D 46/00; A01B 75/00
See application file for complete search history.

(56) References Cited

U.S. PATENT DOCUMENTS 223,468 A    1/1880  Benthall
1,756,803 A  4/1930  Williams
(Continued)

FOREIGN PATENT DOCUMENTS

EP     1705121 A2 *  9/2006  ............ B65B 25/046
FR     2537828 A1 *  6/1984  ............ A01D 46/243
(Continued)

OTHER PUBLICATIONS

EPO machine translation of FR 2537828 A, retrieved May 28, 2014 from http://worldwide.espacenet.com/publicationDetails/description?CC=FR&NR=2537828A1&KC=A1&FT=D&ND=3&date=19840622&DB=EPODOC&locale=en_EP.*
(Continued)

*Primary Examiner* — Stephen F Gerrity
(74) *Attorney, Agent, or Firm* — Amster, Rothstein & Ebenstein LLP

(57) ABSTRACT

A harvest aid machine and method of use is provided comprising a machine having a main chassis. The main chassis includes a roof, a lateral conveyor belt, a chute for storing empty harvest containers and worker stations. The harvest aid machine is powered by a motor and moves using a directional wheel and two rear wheels. Workers load empty containers onto the chute and after the containers slide down the chute, the empty containers rest in a storage station accessible by additional workers. When a worker is ready to harvest a crop, the worker removes the container from the chute and places harvested crops inside the container. The worker then places the harvested crop filled container onto a worker station. After the worker collects multiple harvested crop filled containers, the worker pushes the containers onto a conveyor belt system, adjacent to the worker station, that runs laterally on the machine. When it is time to offload the containers, the conveyor belt system is activated and the containers slide down to one end of the machine to be loaded into a designated vehicle or area. The machine travels through the crop field and can gradually turn onto a different furrow when harvesting of the crops is complete in one area of the field.

20 Claims, 19 Drawing Sheets

(51) Int. Cl.
*A01D 46/00* (2006.01)
*A01B 75/00* (2006.01)
*A01D 46/20* (2006.01)
*A01D 46/24* (2006.01)
*A01D 45/00* (2006.01)

(56) References Cited

U.S. PATENT DOCUMENTS

| | | | |
|---|---|---|---|
| 2,095,007 A | | 10/1937 | Pfister |
| 2,163,851 A | | 6/1939 | Pfister |
| 2,165,551 A | | 7/1939 | Iverson |
| 2,395,124 A | * | 2/1946 | Jelderks ............... 53/391 |
| 2,473,587 A | * | 6/1949 | Huston ............... 53/391 |
| 2,523,832 A | * | 9/1950 | Kunkel ............... 280/32.5 |
| 2,590,965 A | | 4/1952 | Huston |
| 2,676,446 A | | 4/1954 | Johnson |
| 2,699,877 A | * | 1/1955 | Huston ............... 53/391 |
| 2,701,022 A | * | 2/1955 | Chestnutt ............... 180/213 |
| 2,804,739 A | * | 9/1957 | Martin ............... 53/391 |
| 2,825,573 A | | 3/1958 | Shaw et al. |
| 2,833,100 A | * | 5/1958 | Correia ............... 53/391 |
| 2,861,703 A | | 11/1958 | Imazimi et al. |
| 3,033,303 A | * | 5/1962 | Weekly ............... 180/65.1 |
| 3,037,570 A | | 6/1962 | Olson |
| 3,090,457 A | | 5/1963 | Amick |
| 3,351,151 A | | 11/1967 | Miller, Jr. et al. |
| 3,724,168 A | * | 4/1973 | Cassady, Jr. et al. ......... 53/391 |
| 3,825,087 A | | 7/1974 | Wilson |
| 3,827,446 A | | 8/1974 | Honeycutt |
| 3,990,217 A | * | 11/1976 | Aoyama ............... 56/1 |
| 4,073,392 A | * | 2/1978 | Dibler et al. ............... 414/508 |
| 4,206,812 A | | 6/1980 | Viel |
| 4,234,203 A | * | 11/1980 | Johnson ............... 280/32.5 |
| 4,292,784 A | * | 10/1981 | Abatti et al. ............... 53/391 |
| 4,395,186 A | | 7/1983 | Whyte |
| 4,557,368 A | | 12/1985 | Alameda |
| 4,590,739 A | * | 5/1986 | Abatti et al. ............... 53/391 |
| 4,616,468 A | | 10/1986 | Munoz |
| 4,655,667 A | | 4/1987 | Plumb et al. |
| 4,736,574 A | | 4/1988 | Walker |
| 4,876,844 A | | 10/1989 | Grey |
| 4,884,388 A | * | 12/1989 | Ventura et al. ............... 53/390 |
| 5,152,129 A | | 10/1992 | McKenna, Jr. |
| 5,218,812 A | * | 6/1993 | Ventura et al. ............... 53/391 |
| 5,322,409 A | * | 6/1994 | McCluney ............... 414/528 |
| 5,450,716 A | | 9/1995 | Gidge |
| 6,758,317 B1 | | 7/2004 | Colby |
| 7,377,091 B2 | | 5/2008 | Shelton et al. |
| 2004/0139692 A1* | | 7/2004 | Jacobsen et al. ............... 53/391 |
| 2004/0172920 A1* | | 9/2004 | Garcia, Sr. et al. ............... 53/391 |
| 2005/0055993 A1* | | 3/2005 | Maconachy et al. ............... 56/9 |
| 2005/0126144 A1 | | 6/2005 | Koselka et al. |
| 2006/0127207 A1* | | 6/2006 | Corbett ............... 414/508 |
| 2006/0150602 A1* | | 7/2006 | Stimmann ............... 56/10.5 |
| 2007/0113531 A1* | | 5/2007 | Maconachy et al. ............. 56/13.9 |
| 2008/0010961 A1 | | 1/2008 | Gray |
| 2008/0047475 A1* | | 2/2008 | Stehling et al. ............... 111/69 |
| 2008/0245042 A1 | | 10/2008 | Brunnert et al. |

FOREIGN PATENT DOCUMENTS

| | | | | | |
|---|---|---|---|---|---|
| FR | 2550049 | A1 | * | 2/1985 | ............. A01B 75/00 |
| FR | 2663500 | A1 | * | 12/1991 | ........... A01D 46/243 |
| FR | 2683119 | A1 | * | 5/1993 | ........... A01D 45/001 |
| FR | 2872675 | A1 | * | 1/2006 | ............. A01D 46/00 |
| GB | 2334192 | A | * | 8/1999 | ............. A01D 46/00 |
| JP | 09224418 | A | * | 9/1997 | ............. A01B 75/00 |
| JP | 11009011 | A | * | 1/1999 | ............. A01B 75/00 |
| NL | 8902193 | A | * | 3/1991 | ........... A01D 46/243 |
| WO | WO 2008142117 | A1 | * | 11/2008 | ........... A01D 45/001 |

OTHER PUBLICATIONS

Oxnard Mechanical Strawberry Harvest Begins, Ag Accent—Newsletter (Agric. Action Comm., Clovis, CA), Jan. 15, 2008, http://www.fels.org/AgAccent/0801AgAccent.htm, [last accessed Feb. 14, 2011], 4 pages.
Ramsay Highlander, Inc., Field Pack Harvesting Aids, http://www.ramsayhighlander.com/products/field-pack/harvesting-aid.htm, [last accessed Feb. 14, 2011], 1 page.
Naber's Ag Equipment, LLC., http://www.nabersequipment.com/index.html, [last accessed Feb. 14, 2011], 2 pages.
Pam Fisher et al., Highlights of the Oxnard Tour, Feb. 12, 2007, The Ontario Berry Grower (Ministry of Agric. Food & Rural Affairs, Ontario, CA), Jul. 2007, at 3, http://www.omafra.gov.on.ca/english/crops/hort/news/allontario/ao0407.pdf, [last accessed Feb. 14, 2011], 9 pages.
Fred Alvarez, Field Machine Dispute Crops Up, L.A. Times, Jun. 1, 2003, at B-1, http://articles.latimes.com/2003/jun/01/local/me-labor1, [last accessed Feb. 14, 2011], 1 page.
Manzanita Berry Farms, Update on Machine Assisted Harvest, Berry News, Santa Maria, CA, Mar. 15, 2005, http://berries4u.com/news.htm, [last accessed Feb. 14, 2011], 2 pages.
Naber's Ag Equipment, LLC., EasyPick 400 Series Harvest Assistant, http://nabersequipment.com/400serieseasypick.htm, [last accessed Feb. 14, 2011], 2 pages.
Lisa Kitinoja et al., Small-Scale Postharvest Handling Practices: A Manual for Horticultural Crops (4th Edition), Post-harvest Horticulture Series No. 8E, (Jul. 2002, slightly revised in Nov. 2003), http://www.fao.org/docrep/009/ae075e/ae075e00.htm, [last accessed Feb. 14, 2011], 261 pages.
Howard R. Rosenberg, Many Fewer Steps for Pickers—A Leap for Harvestkind?, Choices Magazine (May 2004), http://www.choicesmagazine.org/2004-1/2004-1-02.htm, [last accessed Feb. 14, 2011], 8 pages.
Naber's Ag Equipment, LLC., EasyPick Harvest Assistant, http://www.nabersequipment.com/2easypick.htm, [last accessed Feb. 14, 2011], 5 pages.
Ahmed M. Hussen et al., Estimated Costs and Returns from Mechanical Strawberry Harvest in Oregon: A Progress Report, Special Report No. 556 (Jun. 1979), 32 pages.
Howard R. Rosenberg, Adjusting to Technological Change in Strawberry Harvest Work, Giannini Foundation of Agricultural Economics (2003), 4 pages.

* cited by examiner

HARVEST AID MACHINE

CROSS-REFERENCE TO RELATED APPLICATIONS

This application is a continuation-in-part application of U.S. patent application Ser. No. 12/813,725, filed on Jun. 11, 2010, now U.S. Pat. No. 8,689,527, which claims priority to U.S. Provisional Application No. 61/186,677, filed on Jun. 12, 2009, the contents of both which are hereby incorporated by reference in their entirety.

FIELD OF THE INVENTION

This invention is in the field of harvest aid machines, and more particularly harvest aid machines adapted to aid workers performing the harvest of low-lying crops, and even more particularly harvest aid machines further adapted to load and store empty crates and offload the low-lying crops in filled crates in a manner which does not interfere with the productivity of the workers.

BACKGROUND OF THE INVENTION

Harvest aid machines are known for assisting workers in the harvesting of field crops. For example, U.S. Pat. No. 2,095,007 discloses an apparatus that is adapted to travel under its own power through a field of growing corn such that a number of workers are supported by the apparatus in a position ideal for each worker to simultaneously harvest corn tassels from a plurality of rows of corn. Further, related U.S. Pat. No. 2,163,851 discloses that such apparatus can be further adapted for rear-wheel drive. However, such disclosed apparatus is not adequate for other crops because of the differences in the height of the crop, robustness of the crop to handling, ease of actual harvesting of the crop's fruit, field growing conditions, weather, etc. Low-lying crops, such as strawberries, for example, present concerns greatly different from that of robust field crops, for example. Differences may include size and positioning of the fruit on the planting surface, packing of fruit directly into consumer packaging in the crop field as it is picked, the quantity of fruit harvested per linear foot of plants, delicate nature of the crop and the fact that some fruits, like berries, are rapidly perishable.

Low-lying crops, such as strawberries, are typically expensive to harvest because of the extensive and intensive manual labor involved. Typically, strawberry harvesting requires the workers to remain in a bent, hunched, crouched, or stooped position for extended periods of time as they inspect and harvest the low-lying strawberry fruit. Furthermore, the workers have to travel long distances to reach roads to offload fruit filled containers and subsequently collect empty containers to fill. For example, the workers may pick crops in fields having roads placed approximately every 300 feet. The workers may harvest crops in between roads and deposit fruit filled containers at a designated station on the road closest to the workers. Consequently, the workers may have to travel up to 150 feet to reach one of the roads and travel up to 150 feet back to harvest more fruit in one trip. The traveling of long distances can cause workers to become tired and, eventually, exhausted, thereby negatively effect the speed of the crop harvesting.

Consequently, harvest aid machines have been specifically adapted and modified for assisting workers in the harvest of low-lying berries. For example, U.S. Pat. No. 1,756,803 discloses an apparatus that supports workers in a seated-position for harvesting the berries and further discloses that a canopy is arranged above the workers for sun protection. Similarly, U.S. Pat. No. 3,351,151 also discloses a canopied apparatus which supports workers in a seated-position for harvesting the berries and further discloses that the apparatus is self-propelled.

Strawberries are also delicate and require the proper care and handling so as to eliminate destruction of the individual plants and harvested fruit. Thus, specific to delicate berry crops, harvesting aid machines have been adapted to provide convenient access to various packaging supplies such that the harvested strawberry fruit can be stored, packaged and prepared for transport to customers. For example, U.S. Pat. No. 3,351,151 provides that its disclosed apparatus can be adapted to carry containers into which the harvested crop can be placed. Other patent solutions, such as those disclosed by U.S. Pat. Nos. 3,825,087 and 4,616,468, involve large, bulky carrier-type vehicles in which the frame supports a large platform that is capable of supporting not only packaging containers, but also supporting diverse farm implements and attachments such as sprayers, planters, tanks, chemicals, etc.

Commercial strawberry growers that have used harvesting aids have done so with varying success. For example, the Harvest Pro is a commercially-available mechanical harvest aid machine which precedes the workers across the berry patch, carrying containers and pallets of the harvested strawberry fruit. The Harvest Pro operates on a diesel engine and has fully articulated wheels such that its wheels can move the machine in four directions without having to turn the entire machine around. U.S. Pat. No. 6,758,317 appears to disclose a mechanical harvest aid machine that is similar in operation to the Harvest Pro.

Another example of a commercially-available harvest aid machine is the Field Pack Harvesting Aid, which like the Harvest Pro, is adaptable to conveyor systems where the harvested strawberry fruit can be placed and conveyed through an optional wash tank or spray chamber, packed by size and weight, and loaded to a transport trailer. The Field Pack Harvesting Aid includes convenient features like night harvest lights, a canopy shelter, and sliding axles for aligning to the planting rows.

A smaller, less-sophisticated commercially-available harvest aid machine is the EasyPick Harvest Assistant which does not include any conveyor system but still offers some of the conveniences of the Harvest Pro or Field Pack Harvesting Aid.

While each of these prior art apparatus and commercial products offer the advantages of reducing workplace injury and increasing efficiency, they also have several disadvantages in that they tend to be very expensive to build or purchase, they are often bulky machines that are best-suited for operation in dry weather and square fields having no ditches, and they tend to require large acreage for efficient maneuvering and operation. Additional disadvantages may include lower productivity for workers positioned in a seated or lying picking position as compared to workers working with their feet on the ground such as in a bent, hunched, crouched, or stooped position.

One particular problem associated with the prior art harvest aid machines is that they are often large, bulky machines spanning across over a dozen or more crop rows resulting in increased turning radius and increased operating acreage. Another problem with the prior art harvest aid machines is that the smaller, more-compact designs, as compared to the Harvest Pro, often lack adequate storage space for crates and medical supplies. A further problem is that the more-compact designs, as compared to the Harvest Pro, also lack the capability of being readily scalable to increased production levels or different field designs.

Additional problems with large, bulky machines may include the inability to effectively operate in muddy conditions. Large, bulky machines may also require a dedicated driver, thus, increasing costs. Large, bulky machines are mechanically complex requiring specially trained operators and mechanics to operate and perform maintenance. Large, bulky machines may also reduce worker productivity in that the crews working with the large, bulky machines are typically staffed with 15 or more workers which has the added disadvantage of reduced team efficiency. For example, in a crew of 15 or more workers, faster workers will be required to wait for slower workers and vice versa. Thus, it is advantageous to have a smaller number of workers assigned to a single harvest aid machine.

Accordingly, what is needed is a harvest aid machine that is less bulky, better-suited for all-weather conditions, field designs, and can efficiently maneuver and operate in reduced acreage. Therefore, what is needed is a harvest aid machine that can be readily scaled to differing production levels and field designs and a harvest aid machine that increases or stabilizes crew productivity and worker efficiency.

Additionally, there exists a need for an improved harvest aid machine that can easily load and unload picked crops. There also exists a need for a machine that can provide adjustable worker stations. There further exists a need for protection of the vehicle contents from the environmental elements. There also exists a need for a machine that contains various safety mechanisms. Additionally, there exists a need for a machine that can be powered by an engine controlling a hydraulic pump that assists the loading and offloading of the crops.

Furthermore, there exists a need for harvest workers to be able to control the pace of their harvesting and have the ability to speed up their working pace without relying on the working pace of others. There also exits a need for an improved system that allows workers to be paid in a more efficient manner than to be paid on a per-harvested-box basis.

Further, there exists a need for a three-wheel design chassis that allows for better and gradual handling of turns.

Accordingly, there is a need for a harvest aid machine that allows harvest workers to maximize their work pace while not being interrupted by elements such as other workers, interfering machines, etc. Further, there exists a need for a harvest aid machine that can be loaded with empty crates and offload full crates using a conveyor system that does not interfere with the harvesting workers. Thus, there exists a need for a machine that increases or stabilizes crew productivity and worker efficiency while being lighter weight and aerodynamically optimized to be steered efficiently.

The present application provides these needs and others not specifically mentioned above but described in the sections to follow.

SUMMARY OF THE INVENTION

An improved harvest aid machine according to an exemplary embodiment comprises a self-powered vehicle having a main chassis. Crate storage units may be mounted to the main chassis. In one embodiment, the crate storage unit consists of at least a platform design having at least one platform, or a portion thereof, for receiving crates which have been packed with the harvested crop and a second platform, or a portion thereof, for receiving empty crates. Optionally, at least one platform may include a roller table for receiving packed crates.

In another embodiment, the crate storage unit may include a chute assembly for dispensing of empty crates. The crate storage unit may be further adapted to include a roller table for receiving packed crates. The roller table may be further adapted with control systems, for example friction brakes or levers, for controlling crate movement.

In still another embodiment, at least two harvest modules may be removably mounted to the main chassis. The modular crate storage units may be mounted with a universal, single-sided wheel stanchion. The modular crate storage units may also be width adjustable such that they can be adapted to different crop row spacing or crate sizes. For example, the modular crate storage can be readily adapted to handle 52" crop row spacings, 64" crop row spacings, 68" crop row spacing, etc. The 52", 64" and 68" spacing refers to the distance between the centers of the planting beds.

An object of the invention is to provide an improved harvesting aid machine adapted for improved maneuverability. It is a further object of the invention to provide an improved harvesting aid machine with a near zero-point turning radius.

According to one embodiment, the improved harvest aid machine can easily load and unload picked crops. The crops may be placed in packages such as clam-shell packages that are stacked in crates. The crates can be loaded onto the machine and offloaded onto a conveyor belt type system at any side of the machine without interference. Empty crates may be stored in designated areas of the machine. Gravity feeding chute can provide ease in loading and offloading of empty crates.

In another embodiment, the harvest aid machine can provide adjustable worker stations for accumulating stacks of full crates where when the stacks are ready to be offloaded, the stacks are pushed over from the worker stations onto a lateral conveyor belt that slides the crates off the machine when activated.

In yet another embodiment, the harvest aid machine has an outer covering that can protect the vehicle contents from the environmental elements.

Further, in order to control movement and speed of a self-propelled machine, in another embodiment, the harvest aid machine includes wheel stanchions mounted to choice of points on the chassis of the machine to facilitate multiple row widths.

In another embodiment, the harvest aid machine contains various safety mechanisms such as an emergency stop cable placed around the periphery of the machine to prevent work related injury.

Additionally, in another embodiment, the harvest aid machine can be powered by an engine controlling a hydraulic pump that assists in the offloading of the crops.

In yet another embodiment, harvest workers may control the pace of their harvesting and have the ability to speed up their working pace without relying on the working pace of others. Accordingly, in one embodiment, the harvest aid machine allows harvest workers to maximize their work pace while not being interrupted by elements such as other workers, interfering machines, etc. In another embodiment the harvest aid machine that can be loaded with empty crates for harvest aid workers to use without interfering with their harvesting. Thus, the harvest aid machine includes an offloading conveyor system that does not get in the way of the harvesting workers or the workers loading the empty crates onto the machine.

The harvest aid machine of the present application thereby increases or stabilizes crew productivity and worker efficiency while being lighter weight and aerodynamically optimized to be steered efficiently. The improved harvest aid machine of the present application also allows workers may also be paid in a more efficient manner than to be paid on a per-harvested-box basis.

Additionally, the placement of roads in between crops can be spaced at greater distances as the harvest aid machine can travel with the workers. Alternatively, the roads can be eliminated all together providing for additional area that can be used to grow crops, etc.

Another embodiment of the harvest aid machine includes a three-wheel design chassis that allows for better and gradual handling of turns. In yet another embodiment of the harvest aid machine, when turning the machine, the wheels operate in an analog manner and allow for a gradual turn.

These and other features of this invention are described in, or are apparent from, the following detailed description of various exemplary embodiments of this invention.

BRIEF DESCRIPTION OF THE DRAWINGS

Exemplary embodiments of this invention will be described with reference to the accompanying figures.

DETAILED DESCRIPTION OF THE EXEMPLARY EMBODIMENTS

Figure 1:
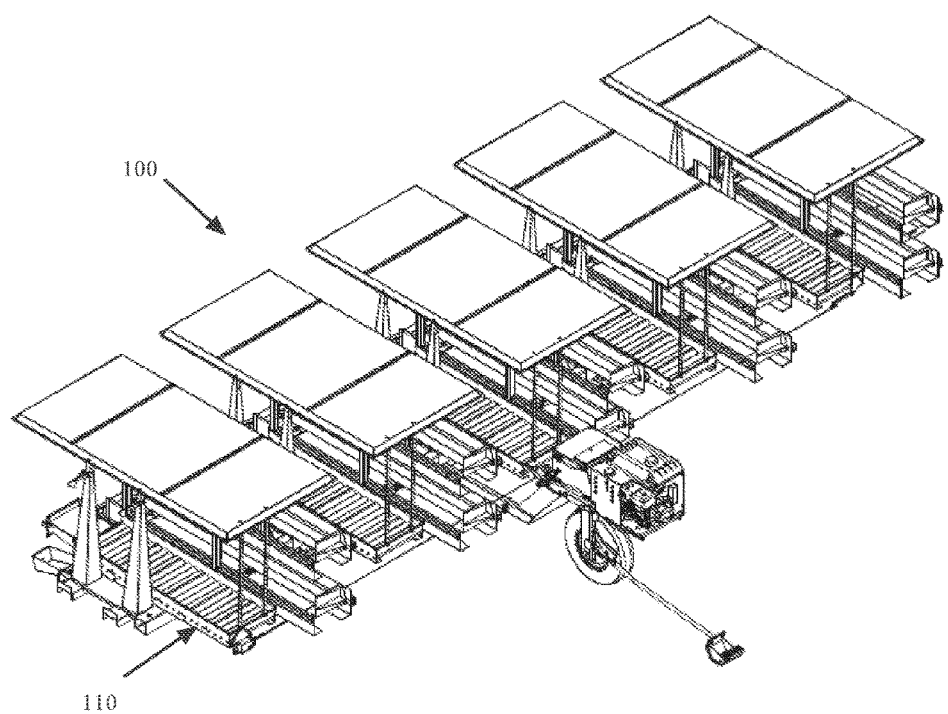
FIG. 1 is a perspective view from the front side of a first embodiment of an improved harvesting aid machine.

FIG. 1 illustrates a harvest aid machine 100 of one embodiment of the present application. Machine 100 is self-powered vehicle having a main chassis 110. At least one platform may be mounted to the main chassis 110 of machine 100. In an exemplary embodiment, at least one platform for receiving and storing crates which have been packed with the harvested crop is provided, and optionally a second platform may be provided for storing empty crates. The platform may be designed in sections such that a single platform may include a portion for receiving packed crates and a portion for storing empty crates. In an exemplary embodiment, a bi-level platform is mounted to the main chassis of machine 100 such that the lower-level platform is used for receiving packed crates and the upper-level platform is used for storing empty crates. Of course, the bi-level platform may be readily sectioned and configured for providing additional storage areas, for example, a storage area for harvesting implements, emergency supplies, refreshing station, etc.

Figure 2A:
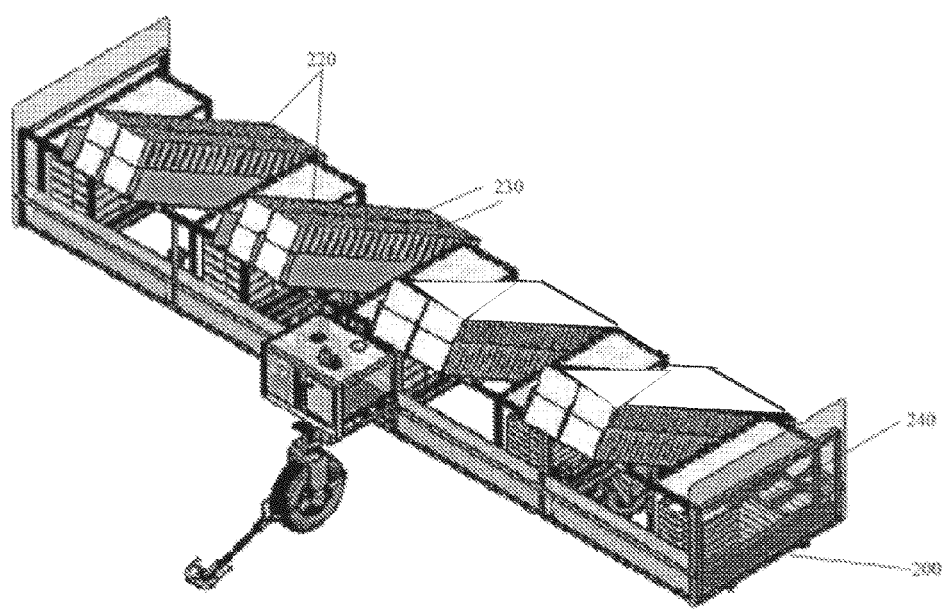
FIG. 2A is a perspective view from the front side of a second embodiment of an improved harvesting aid machine.
Figure 2B:
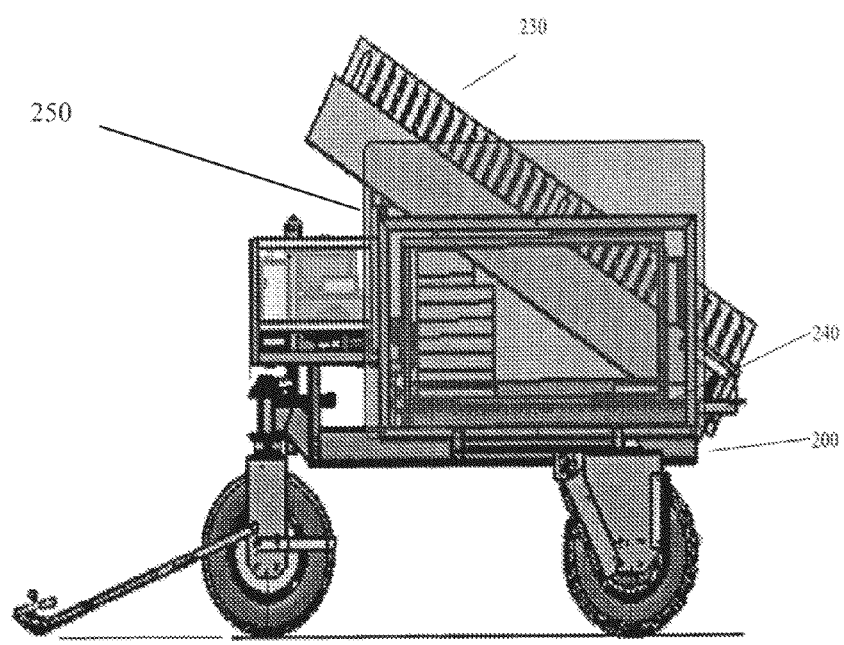
FIG. 2B is a side view of a second embodiment of an improved harvesting aid machine.

FIGS. 2A and 2B illustrate a harvest aid machine 200 of a second embodiment of the present invention. In an exemplary embodiment, a crate storage unit 220 may be provided in which empty crates are gravity-dispensed. In an exemplary embodiment, crate storage unit 220 includes chute assembly 230 for storage of empty crates. The dimensioning of the chute assembly 230 may be configured in adjustable sections for storing 52", 64" and 68" crates.

Crate storage unit 220 may be further adapted for receiving packed crates. In an exemplary embodiment, crate storage unit 220 includes a roller table 240 for receiving packed crates. The roller table 240 is secured to the chassis at the rear side of the machine and to a hydraulic cylinder 250 at a location proximate to the front side of the machine 200. The default position of the roller table 240 is sloped from the rear side of the machine towards the front side of the machine such that the roller table 240 is relatively higher off the ground at the rear side of the machine. Utilizing this particular configuration allows for gravity assisted loading of full crates. Once full crates have been loaded, hydraulic cylinder 250 is vertically extended, thereby causing the slope of the roller table to change such that the roller table is relatively higher off the ground at the front side of the machine 200. By using the hydraulic cylinder 250 to reconfigure the slope of the roller table 240 in this manner, gravity assistance can be used to unload full crates from the rear side of the machine. This system allows for a reduction in the amount of energy expended by the worker when packing crates by allowing the worker to use gravity assistance to both load and offload full crates from the rear side of the machine.

Figure 3A:
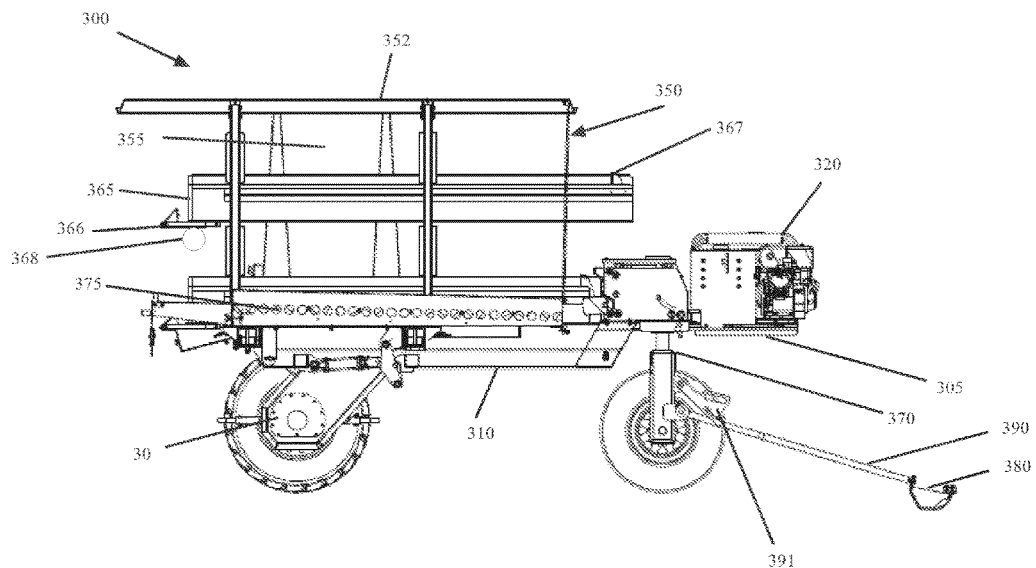
FIGS. 3A and 3B are side views of an improved harvesting aid machine according to another exemplary embodiment of the present invention.
Figure 3B:
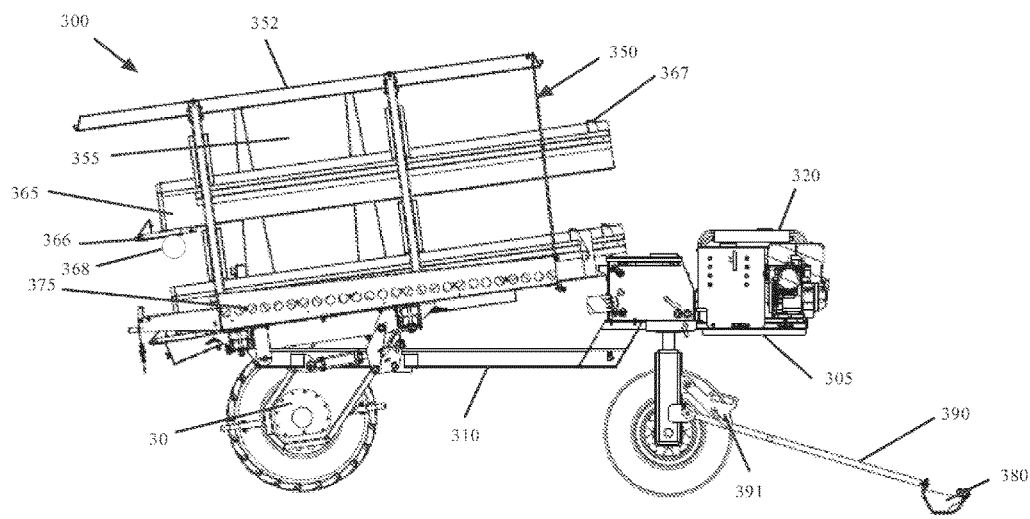
Figure 4:
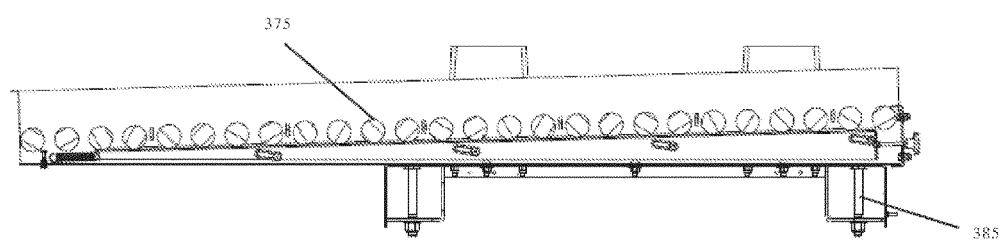
FIG. 4 is a side view of a full crate storage roller table of the harvesting aid machine of FIGS. 3A and 3B.
Figure 5:
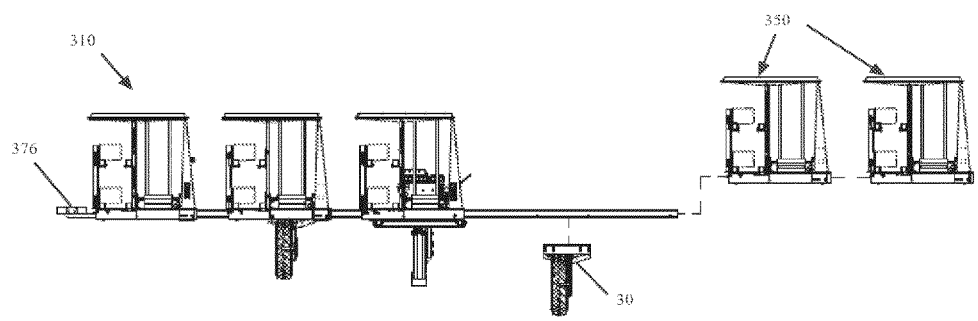
FIG. 5 is a back view of the harvesting aid machine of FIGS. 3A and 3B showing the spacing of the wheels being laterally adjustable.
Figure 6A:
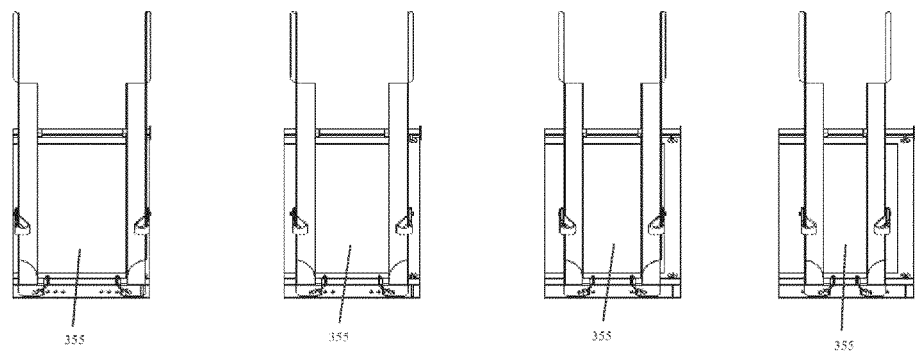
FIG. 6A is a top view of the harvesting aid machine of FIGS. 3A and 3B showing the width of the empty crate storage chute being adjustable.
Figure 6B:
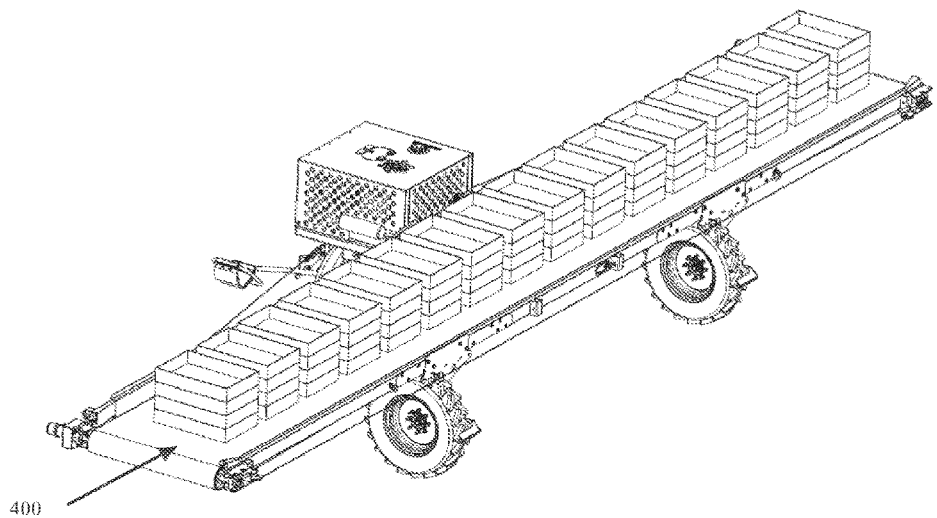
FIG. 6B is a perspective view of a conveyor system useable with the harvesting aid machine of FIGS. 3A and 3B.

FIG. 3 illustrates harvest aid machine 300 of the present application in a crop field. Machine 300 is a self-powered vehicle using, for example, a gas engine 320 turning a hydrostatic hydraulic pump. A number of workers work on a loading side 305 of machine 300. Machine 300 includes a main chassis 310 onto which harvest modules 350 can be mounted. Machine 300 may include one or more propelled wheels. Machine 300 may also include one or more non-propelled wheels used for steering.

Harvest modules 350 may be mounted with universal, single-sided wheel stanchion 30, which may enclose hydraulic motors, turn sprockets, chains, etc., or any combination thereof, of the wheel assembly. Wheel stanchion 30 may house one or more propelled wheels. In an exemplary embodiment, wheel stanchion 30 is a universal, single sided drive leg that is extra narrow with, for example, a 4:1 gear reduction. The single sided design permits easier access and maintenance, such as changing a tire. Wheel stanchion 30 may also include a sealed oil bath design to keep internal components free of mud and grit, and lubricated, for longer operation. A hydraulic manifold may be included with wheel stanchion 30 that integrates all of the hydraulic control functions into a single-unit including a high pressure filter to protect components from small wear particles. A hydraulic manifold may also be located in a sealed box near the gas engine.

Harvest modules 350 may be modular single-units having integrated empty crate storage 355 and feeding mechanisms 365 (system to propel empty crates) and a full crate storage roller table 375. The empty crate storage and feeding mechanisms may also include a spring loaded box retention device 367 allowing for push-in loading with single crate feeding release (singulator 366). The full crate storage roller table 375 receives crates loaded with harvested berries. In an exemplary embodiment, packed crates are gravity loaded on the roller table. The full crate storage roller table 375 may be equipped with a load holding brake that allows static travel along with easy unloading. Harvest module 350 may be further adapted to include a pallet storage area and an additional storage area 376 for in-field necessities.

Machine 300 further includes a single-sided front steering leg 370 allowing for easy tire changes. Front steering leg 370 may use a common bearing pivot for rotational durability, ease of maintenance and lowering costs.

Machine 300 optionally includes a single-sided self steering skid 380 permitting machine 300 to track a furrow in the ground, thereby steering itself. Skid 380 includes special material surfaces, such as Teflon plastic, for example, which reduce wear on the arm and allows for easy replacement of worn surfaces. The width of skid 380 is adjustable for varying furrow sizes and depths. Skid arm 390 may include a retainer latch 391 that releasably locks in position when the arm is lifted into an upper range to support the weight for easy hand steering. Retainer latch 391 may also prevent over travel of the skid arm in the downward direction to protect against sudden drops in the furrow depth.

Hydraulic oil may be carried to wheel stanchion assembly via high pressure hose lines. Harvest modules 350 may include an integrated, durable roof 382 to reflect heat, provide shade and additional protections from inclement weather and other environmental concerns, such as providing shade to the harvested crop, for example.

In an exemplary embodiment, machine 300 includes a main chassis 310 onto which at least two harvest modules 350 are removably mounted. For example, between two and seven modules 350 may be removably mounted on the main chassis 310. In an exemplary embodiment, at least five modules 350 are removably mounted on the main chassis 310. The five modules 350 may be removably mounted on the main chassis 310 by laterally sliding modules 350 along support arms of main chassis 310. Optionally, a harvest module 350 may be inserted into each end of the support arms of main chassis 310 providing machine 300 with seven harvest modules 350.

In an exemplary embodiment, machine 300 of the present application includes a main chassis 310 onto which five harvest modules 350 are mounted and at least two of the harvest modules 350 having wheel stanchions 30 mounted thereon. Of course, harvest modules 350 may be added or removed to suit production levels.

Machine 300 adapted for use in the harvest of strawberries will now be generally described. Workers may load empty crates into each of the crate storage areas of harvest modules 350. Workers may also load an empty pallet onto the pallet storage rack of harvest module 350. Workers may also load "slip sheets" onto the pallet storage rack. "Slip sheets" are flat pieces of cardboard that are placed between layers of crates on the pallet at specified intervals to help secure the crates together on the pallet. Machine 300 is driven along a headland for insertion into the strawberry patch. Harvest modules 350 are adjusted and spaced according to the planting of the crop row width. In an exemplary embodiment, harvest modules 350 can be moved laterally along main chassis members for performing crop row width adjustments. Modules 350 are readily adjustable to changes in row width spacing, for example 52", 64" and 68", which allows the machine 300 to be used on different farm locations regardless of field design.

Having aligned the harvest modules 350, machine 300 is inserted into the strawberry patch. Machine 300 is optionally controlled via a remote operated by one of the workers or by the front steering bar. Once machine 300 is inserted into the field and the front steering bar has engaged the furrow, the steering bar is placed on the ground by a worker. Workers positions themselves on a loading side 305 of machine 300 to being the picking of strawberry fruit. Workers will follow behind machine 300 as they perform the harvest of the strawberry fruit. Machine 300 includes optional storage areas for first aid kits, medical supplies, lunchbox coolers and watercoolers. Machine 300 further includes a cable trolley inventory control system and a computerized probe for scanning employee information, such as an employee identification number. The use of a computerized probe in connection with the workers daily work routine better enables tracking of, for example, inventory and employee productivity.

Each worker removes an empty crate from the empty crate storage 355 and feeding mechanism 365 and places it on a field transport, for example, a hand cart which carries the crate at a height which is convenient for the worker to pack the strawberries into the crate. With the empty crate on the hand cart the worker begins to pick and pack the strawberry fruit, proceeding down the crop row. Strawberries are typically packed in "clam shells" or baskets, depending on the size of the clamshell or basket, between two and eight clamshells may be fitted into one crate. Generally, clamshells are packed one at a time in the crate. Crates may also come preloaded with empty clamshells or baskets.

Once a crate is full, the worker may transport the full crate back to machine 300, which has been moving forward at a continuous pace similar to the pace at which the worker has been advancing through the field. Workers may typically be positioned 10 to 50 feet behind machine 300 when they fill their crate.

Once the full crate arrives at machine 300, a worker may place the full crate on the full crate storage roller table 375. The roller table is secured to the chassis at the rear side of the machine and to a hydraulic cylinder 385 at a location proximate to the front side of the machine. In its default position, the roller table is sloped from the rear side of the machine towards the front side of the machine such that the roller table is relatively higher off the ground at the rear side of the machine. This slope configuration allows for the gravity-assisted loading of full crates by workers in the field. As used in the field, each worker may be assigned a specific harvest module 350 which may be centered over the crop row that the worker has been assigned. Workers may then build a stack of crates eight high on the roller table before releasing a roller table brake lever, and thereby, cause the crates to move forward on the roller table in order to make room for the next crate stack. Once the roller table has been filled with packed crates, the slope of the roller table may be adjusted using a hydraulic cylinder 385, which vertically extends to cause the slope of the roller table to change such that the roller table becomes relatively higher off the ground at the front side of the machine 300. Accordingly, once the roller table brake is released, gravity will facilitate the movement of the full crates towards the rear side of machine. By using the hydraulic cylinder 385 to reconfigure the slope of the roller table in this manner, gravity assistance can be used to unload full crates from the rear side of the machine. This system allows for a reduction in the amount of energy expended by the worker by enabling the use of gravity to assistance in both the loading and offloading of full crates from the same side of the machine. After one of more full crates is loaded and unloaded from the roller table, a worker may repeat the above cycle.

When machine 300 has accumulated enough fruit to build a pallet, typically 108 crates, machine 300 will stop to unload at the next field crossroad or "headland" that it comes to. Typically crossroads are placed at standard intervals throughout the crop field, perpendicular to the crop rows to facilitate removal of the harvested fruit from the field.

An empty pallet that may have been previously loaded on a pallet storage rack of machine 300 is removed from its storage rack and placed on the crossroad behind the machine. Each worker may then unload the full crates from their assigned harvest module 350. Crates may also be removed in stacks of four by the workers. Workers may place the stacks of four crates on a pallet in a specified orientation. Slip sheets may be removed from machine 300 and positioned on the pallet or full crates at specified intervals.

Alternatively, full crates may be mechanically transferred to a vehicle that is designed to engage the loading side 305 of machine 300, thus, eliminating the need for the workers to manually off load the full crates. The vehicle may then transport the full crates to a centralized area to be palletized.

When a pallet has been completely loaded, workers may reload machine 300 with empty crates. Generally, empty crates are prepositioned along a crossroad.

Machine operator may initiate forward motion of machine 300 to continue across the road, into the next furrow ahead where workers may continue the harvesting cycle. Upon reaching the end of the field, the machine operator may reposition on the front side 315 of machine 300 such that machine 300 can be guided through its turn via the steering handle, and optionally by the remote control. As machine 300 exits the crop rows, a machine operator may initiate a turn on the "headland." In tight spaces on the headland, a machine operator may initiate a tighter turn by engaging the "counter rotate" functionality by moving the steering handle to its maximum turn position. For example, the rear wheel that is at the outside of the turn may continue to rotate forward while the rear wheel at the inside of the turn may rotate in reverse direction. When the turn has been completed, a worker moves the steering handle out of the full turn position. If a less sharp turn is required, a worker may move the handle to a turning position less than full turn. In this intermediate position the rear wheel at the inside of the turn may automatically stop rotating while the rear wheel at the outside of the turn may continue rotating, thus facilitating of the machine but in a wider radius than the counter rotate functionality.

The zero-point turn radius may be achieved using a control computer programmed to allow each of the wheel stanchions 30 to spot turn by counter-rotating in forward and reverse to allow a zero turn radius at the headlands, using less farm ground for roads and more production. Control computer may be operated from a control station attached to machine 300 or optionally remotely controlled. For example, a microprocessor control system with integrated wireless and frequency addressing so that only a remote trained to the receiver can control machine 300. Control station allows machine 300 to pause, forward, emergency stop, move faster, move slower, etc.

Once turned, a worker may align machine 300 with the next set of rows to enter and guides the steering handle into the furrow and places it on the ground to engage the furrow. The machine operator returns to a loading side of machine 300 to continue picking strawberry fruit.

Throughout the field, the operator, who is also picking, can adjust the forward motion and speed of the machine via the remote control to closely match the motion of the machine to the forward progress of the pickers.

After harvest of the crop row has been completed, machine 300 stops at a headland whereby machine 300 changes direction to traverse the headland to the next set of crop rows, change directions in a zero-point turn radius method of the present application to traverse, again, a set of crop rows, or any combination thereof.

Machine 300 includes a frame tilting system to hold machine 300 in a lowered travel state but still allowing for sufficient tilt to ease unloading of machine 300.

Figure 7:
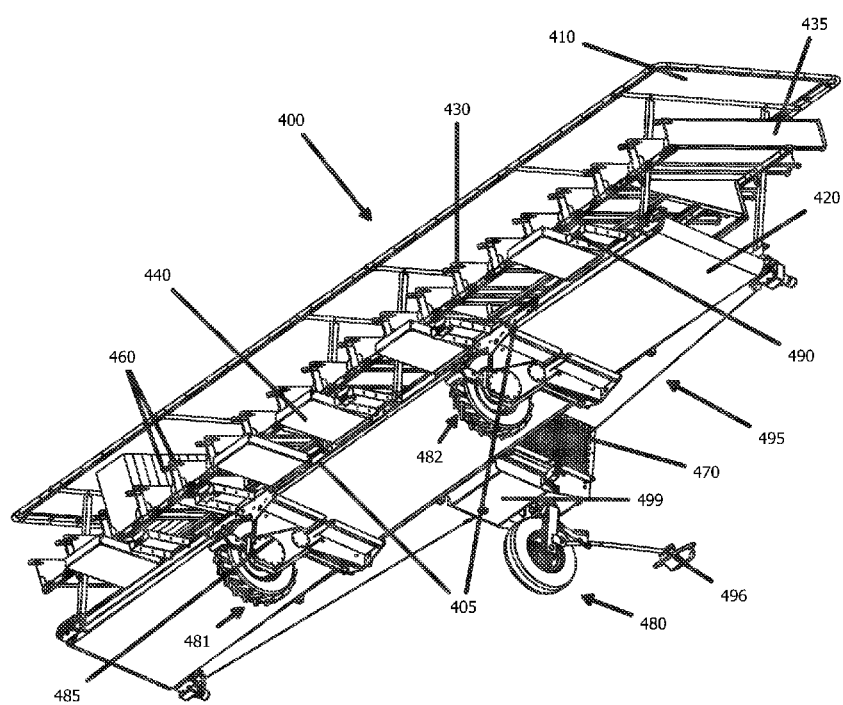
FIG. 7 is a perspective view from the back side of a fourth embodiment of an improved harvesting aid machine.

According to a fourth embodiment of the present application, FIG. 7 illustratively depicts a perspective view of the back of the harvest aid machine 400. The harvest aid machine 400 comprises a main chassis 405 which includes various components. The bottom of the machine includes a front or steering leg 480, a right leg 481 and a left leg 482. Each leg can have a respective wheel attached thereto. As in the other embodiments, each leg may have a respective stanchion 485. Each universal, single-sided wheel stanchion 485 may enclose hydraulic motors, turn sprockets, chains, etc., or any combination thereof, of the wheel assembly. Wheel stanchion 485 may house one or more propelled wheels. In an exemplary embodiment, wheel stanchion 485 is a universal, single sided drive leg that is extra narrow with, for example, a 4:1 gear reduction. The single sided design permits easier access and maintenance, such as changing a tire. Wheel stanchion 485 may also include a sealed oil bath design to keep internal components free of mud and grit, and lubricated, for longer operation. A hydraulic manifold may be included with wheel stanchion 485 that integrates all of the hydraulic control functions into a single-unit including a high pressure filter to protect components from small wear particles. A hydraulic manifold may also be located in a sealed box near the gas engine.

Figure 18:
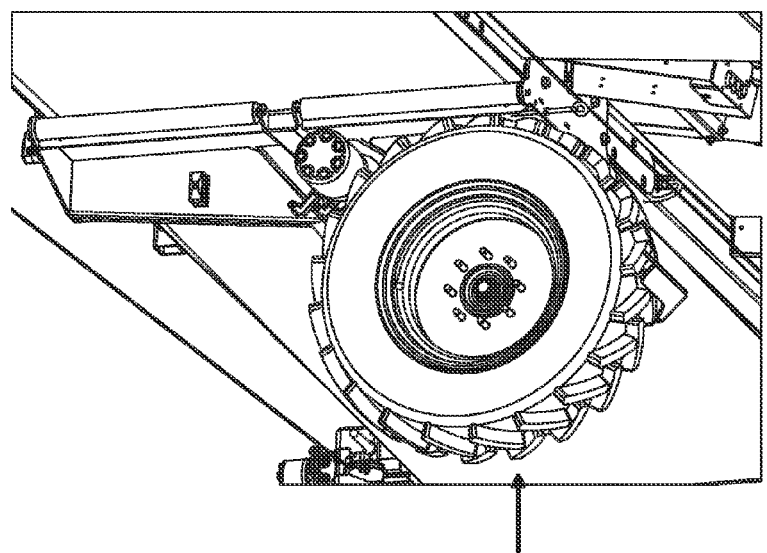
FIG. 18 is a partial view illustratively depicting the various components of one of the legs of a fourth embodiment of the improved harvesting aid machine.

The various functionalities of the stanchion discussed above with respect to different embodiments apply to the fourth embodiment as well and will not be further described in detail. A close-up view of one of the rear legs, for example, right leg 481, can be seen in FIG. 18.

According to an exemplary embodiment of the present application, the main chassis 405 may be a fixed width chassis. A conveyor belt system 420 may be used for offloading full crates at either side of the machine. The conveyor belt system 420 may be any type of automatic or manual system known in the art. In an exemplary embodiment, the conveyor belt system 420 runs laterally (i.e., from right to left or vice versa). In a preferred embodiment, the conveyor belt system 420 may be controlled by an operator using a control device. In an exemplary embodiment, the operator may use the control device to control various functions of the conveyor belt system 420. For example, the control device may stop, start, slow down, speed up, etc. the conveyor belt system 420. In a preferred embodiment of the present application, a push button located on the harvest aid machine 400 or alternatively, on a remote control, activates/deactivates the conveyor belt system 420. Of course, other types of conveyor belt systems and/or controls may be used without departing from the spirit or scope of the present application.

Worker stations 440 extend outward from directly below the conveyor belt system 420 on the main chassis 405. The width and/or depth of the worker stations 440 can be adjusted, as needed, to accommodate the various sizes of full crates. Additionally, these worker stations 440 may be removed and/or relocated from the designated areas of the main chassis 405. For example, to accommodate more workers, additional worker stations 440 may be added. Worker stations 440 may be removed or relocated for example, to optimize the use of the machine and given space. In one embodiment of the present application, up to seven worker stations 440 can be provided. Of course, other arrangements and/or sizes of the worker stations than the ones described may be provided without departing from the spirit or scope of the present application.

Figure 16:
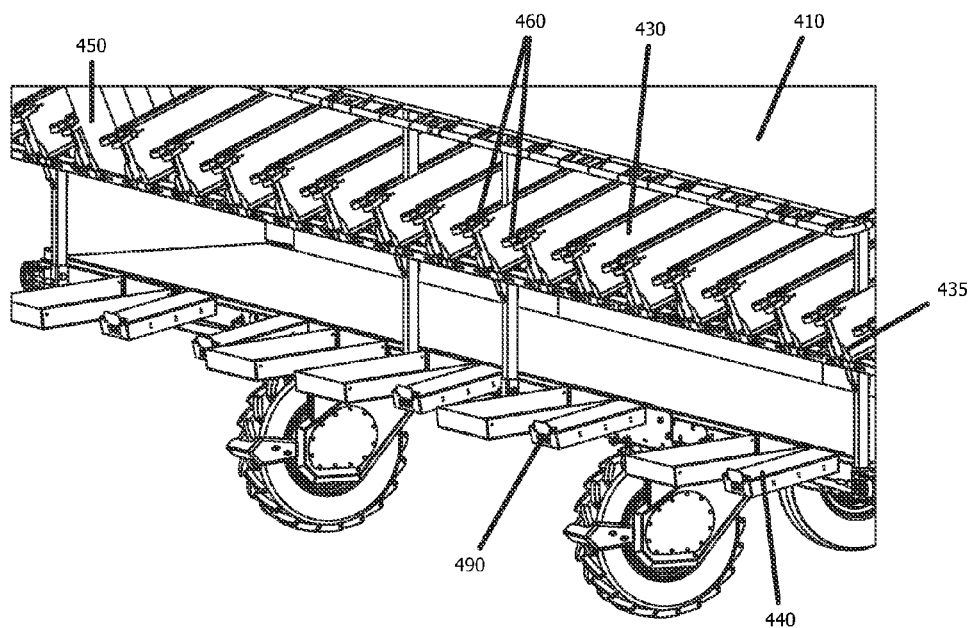
FIG. 16 is a partial back view of a fourth embodiment of an improved harvesting aid machine placed in a strawberry crop field.

In one embodiment of the present application, a worker station 440 may include a tray that holds empty packages, such as clam-shell packages. Workers may share these areas and fill the empty clam-shell packages with the harvested crops. Of course, these worker stations 440 and/or areas can be used for other purposes. In another embodiment of the present application, the worker stations 440 can be slightly angled and have cavities or raised edges on the ends of the stations for the purpose of housing and immobilizing any products, crates, containers, etc., placed on the worker stations 440. A close up view of the worker stations 440 can be seen for example in FIG. 16.

Adjacent the worker stations 440 or affixed thereto are the rear-control stations 490. In one embodiment of the present application, these stations can provide further control to the workers harvesting fruit out in the field. In an exemplary embodiment, one or more workers may be provided with the ability to start, stop, slow down, speed up, etc. the harvest aid machine 400 by using the control buttons on the rear-control stations 490. In this way, when workers are out in the field harvesting fruit into crates, one or more of these workers can control the speed of the drivetrain of the harvest aid machine 400.

Figure 8:
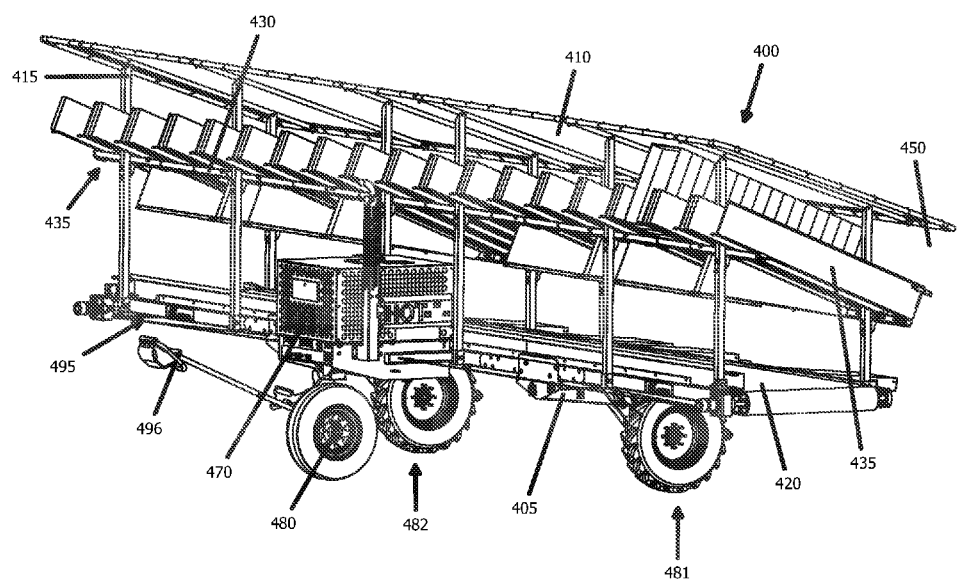
FIG. 8 is a perspective view from the front side of a fourth embodiment of an improved harvesting aid machine.
Figure 9:
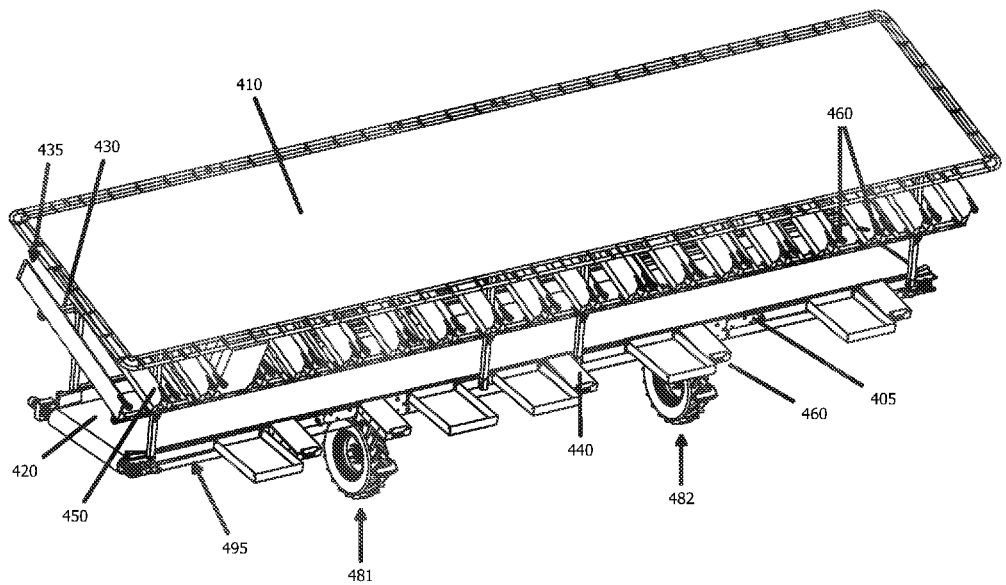
FIG. 9 is a perspective view from the top side of a fourth embodiment of an improved harvesting aid machine.

As seen in FIGS. 7-9, a gravity feeding chute 435 holds empty crates 450. In a preferred embodiment of the present application, the gravity feeding chute 435 is angled in such a way to slope down from the front of the machine to the back of the machine. That is, the front-side of the gravity feeding chute 435 is greater in height than the rear-side of the gravity feeding chute 435. In this way, a container or product placed within the designated empty crate storage stations 430 slides right down from the front side of the gravity feeding chute 435 to the rear-side of the gravity feeding chute 435.

Figure 17:
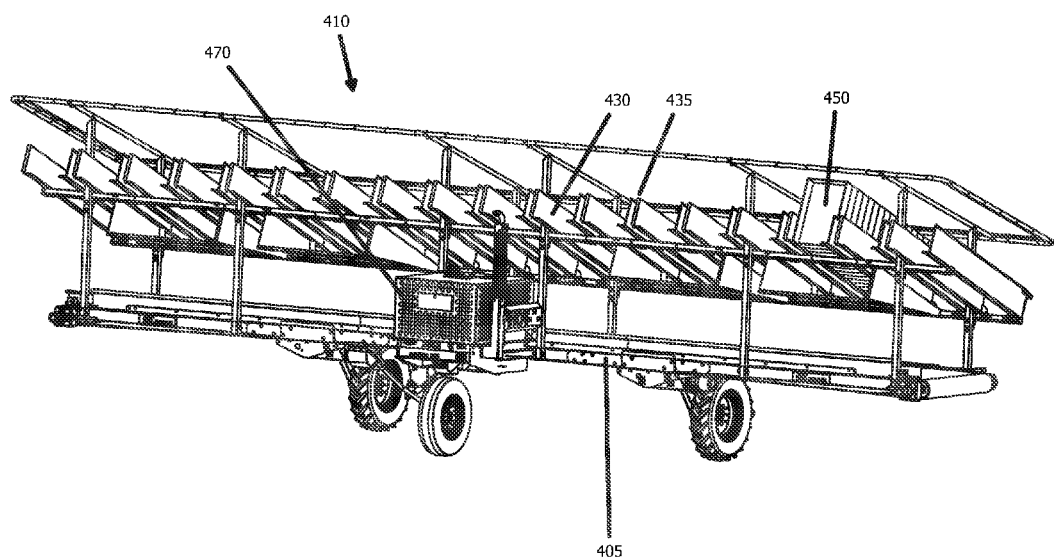
FIG. 17 is a front view of a fourth embodiment of an improved harvesting aid machine placed in a strawberry crop field.

In the exemplary embodiment of the present application, workers stationed at the front side of the harvest aid machine 400, as illustratively depicted in FIGS. 8 and 17, fill the empty crate storage station 430. The empty crate storage station 430 can be loaded from an opening in the front and is gravity positioned at a decline in the back or rear of the harvest aid machine 400. As seen in the figures, many empty crate storage stations 430 can be a part of the gravity feeding chute 435. An empty crate box 450 slides down the opening of the empty crate storage station 430 of the gravity feeding chute 435 after the worker loads it. In one embodiment of the present application, the first empty crate box 450, as illustratively depicted in FIGS. 7 and 16, rests at the edge of the empty crate storage station 430 and may be at least partially held in place by using a pair of straps 460 and/or an edge of the frame of the empty crate storage station 430. In a preferred embodiment of the present application, each of the pair of straps 460 are constructed of a rubber material. Of course, each of the pair of straps 460 may be constructed of any reasonable material from an animal source, plant source, mineral source, and synthetic source, and/or any other reasonable source. The crate storage stations 430 may be adjustable to accommodate various dimensions, shapes and sizes of empty crate boxes 450.

Figure 14:
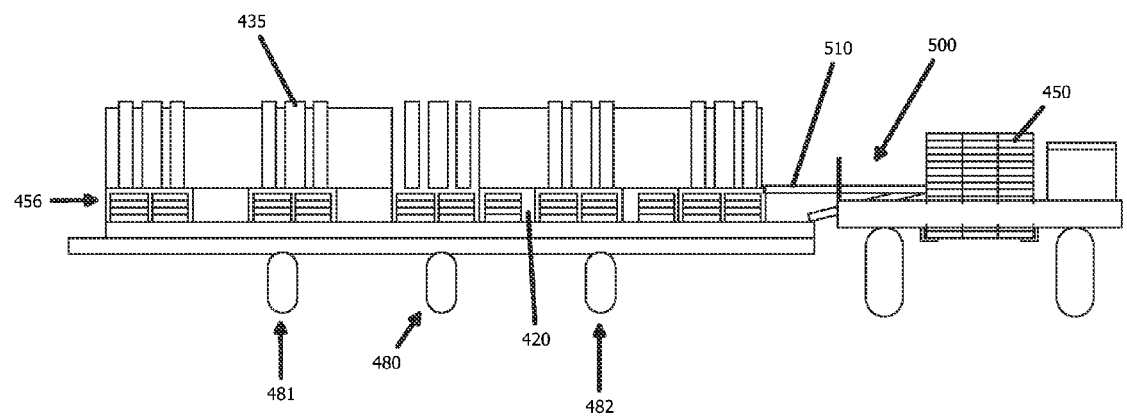
FIG. 14 is a front view of a fourth embodiment of an improved harvesting aid machine and a transfer vehicle.

Several methods may be used to load the empty crate boxes 450 onto the gravity feeding chute 435. In one embodiment of the present application, as shown in FIG. 14, a transfer vehicle 500 may be used to load empty crate boxes 450 onto the gravity feeding chute 435 by using a transfer belt system or a catwalk 510. The catwalk 510 may be placed over the conveyor belt system 420 to facilitate the loading of empty crate boxes 450 from the front of the harvest aid machine 400. In one embodiment of the present application, workers load the empty boxes 450 from the transfer vehicle 500 onto the gravity feeding chute 435 from the front of the harvest aid machine 400 without interfering with the workers that are harvesting fruit at the back side of the harvest aid machine 400. As described above, when the empty crate boxes 450 are fed down the gravity feeding chute 435 and rest into the designated empty crate storage stations 430, these empty crate boxes 450 are made available to the harvesting workers.

In one embodiment of the present application, the empty crate box 450 may arrive in a stack strapped together. The stack is inserted onto the gravity feeding chute 435, with the bottom of each box facing the harvest work so that the pre-loaded clam-shell packages do not fall out when the box when the box is removed. When the stack of boxes is needed, the strap holding the stack of boxes together is cut by the harvest worker when the worker needs any boxes from that stack. In an alternate embodiment, the harvesting workers may manually place the clam-shell packages into the empty crate box 450. In another embodiment of the present application, additional packages for housing the fruit may not be used.

When the crate boxes are filled with fruit, the full crate boxes 455 are placed onto the worker stations 440 and are then transferred as units of one or more filled crate boxes 455 onto the conveyor belt system 420. In one embodiment of the present application, the a unit or pallet 456 comprises four full crate boxes 455 stacked on top of one another. Of course, a pallet 456 may comprise any other arrangement of full crate boxes 455 without departing from the spirit or scope of the present application.

An exemplary embodiment of how the empty crate boxes 450 are filled is described herein. A harvesting worker located in the back of the harvest aid machine 400 collects an empty crate box 450 from the empty crate storage station 430. The harvesting worker then harvests the crops, such as strawberries, in a known manner. In one embodiment of the present application, the harvesting worker places the empty crate box 450 onto a metal hand cart 700 and picks fruit in the field and places the picked fruit into the empty crate box 450. Of course, other means of harvesting fruit may be used without departing from the spirit and scope of the present application.

After one empty crate box 450 is completely filled with harvested fruit, it becomes known as a full crate box 455. The harvesting worker places the full crate box 455 onto a designated worker station 440. At this point, the harvesting worker may continue to fill and collect a plurality of crate boxes. In a preferred embodiment, a harvesting worker fills four full crate boxes 455 and stacks them on top of one another to create a unit or pallet 456 of crates. Such a pallet 456 is then transferred from the worker station 440 onto the conveyor belt system 420. In one embodiment of the present application, the worker pushes the pallet 456 onto the conveyor belt system 420.

Figure 15:
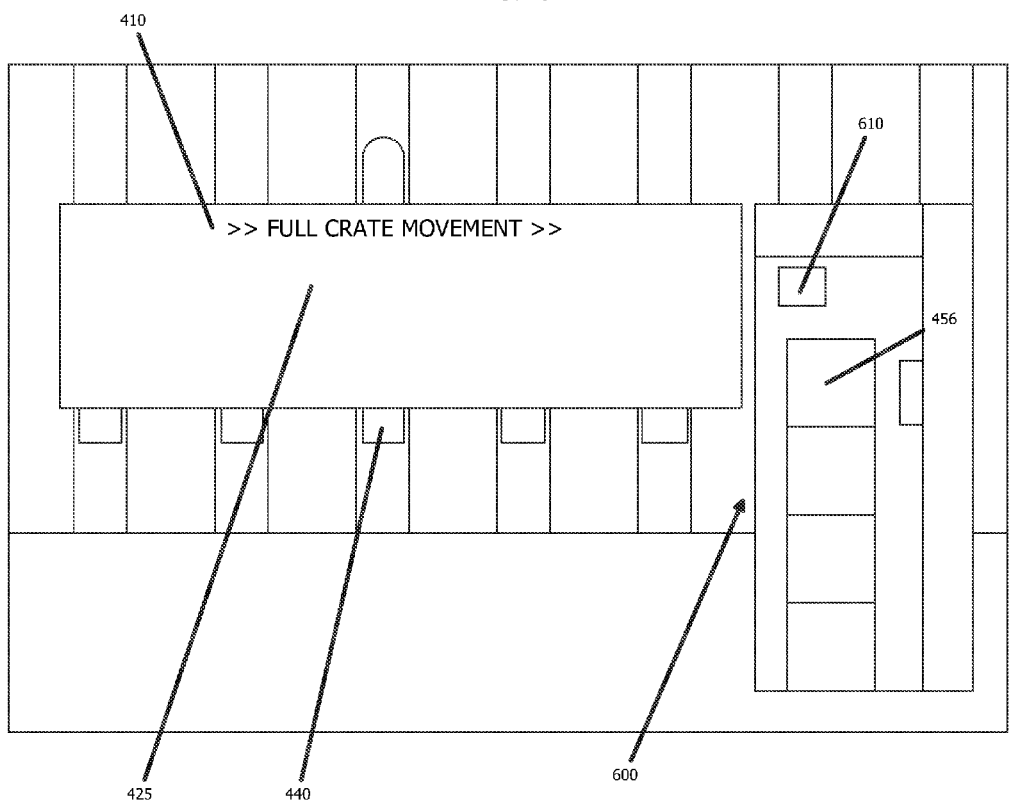
FIG. 15 is a top view of a fourth embodiment of an improved harvesting aid machine and a designated collection vehicle.

When the conveyor belt system 420 is ready offload the pallet 456 of crates, the conveyor belt system 420 may be activated, for example, by push of a start/stop button. The conveyor belt system 420 may be driven by a hydraulic motor and actuated by the start/stop button, which may be located at one or both ends of the machine. The items placed on the conveyor belt system 420 offload to the side of the harvest aid machine 400. The conveyor belt system 420 may offload the products on either side of the machine. In one embodiment of the present application, a designated collection vehicle 600 may be placed to collect the offloaded products as shown in FIG. 15. Specifically, the pallet 456 of crates placed on the conveyor belt system 420 (not shown in FIG. 15) move in a sideways direction 425 as indicated by the arrow showing the full crate movement upon activation of the conveyor belt system 420. That is, the conveyor belt system 420 of the harvest aid machine 400 is designed to move in a lateral direction.

In one embodiment of the present application, the lateral movement of the conveyor belt system 420 to offload products does not interfere with harvest workers picking fruit and/or workers loading empty crate boxes 450 in a front-to-rear direction.

The designated collection vehicle 600 is operated by an operator station 610. In one embodiment of the present application, the designated collection vehicle 600 may comprise a forklift system that transfers the pallets 456 from the harvest aid machine 400.

In another embodiment, the harvest full crate boxes 455 and/or pallets 456 may be transported to another designated area, machine or placed on the ground. Of course, other means of offloading the harvested crops than the ones described may be used without departing from the spirit and scope of the present application.

An engine 470 is located in the front portion of the harvest aid machine 400. A more detailed view of the engine 470 is illustratively depicted in FIG. 8. According to a preferred embodiment of the present application, the engine 470 may be a 14 horsepower (HP) gas engine that may be affixed to the main chassis 405. In an exemplary embodiment, the engine 470 may not be removable. The exhaust may of the engine 470 can be located at the top of the machine to provide for reduced noise and/or heat. The engine 470 can provide power to the drivetrain of the harvest aid machine 400 and the conveyor belt system 420.

A roof 410 may be provided on the harvest aid machine 400. The roof 410 may be a tarpaulin roof constructed completely of metal and may protect the vehicle, the harvest fruit, the workers, etc. from environmental elements such as the sun and rain. In an exemplary embodiment of the present application, the roof 410 may have a canvas covering supported by metal frame members 415 as illustratively depicted in FIG. 8. The canvas covering may be constructed of a continuous piece of material. Of course, the various components of the roof 410 may be constructed of any reasonable material from an animal source, plant source, mineral source, and synthetic source, and/or any other reasonable source.

Figure 10:
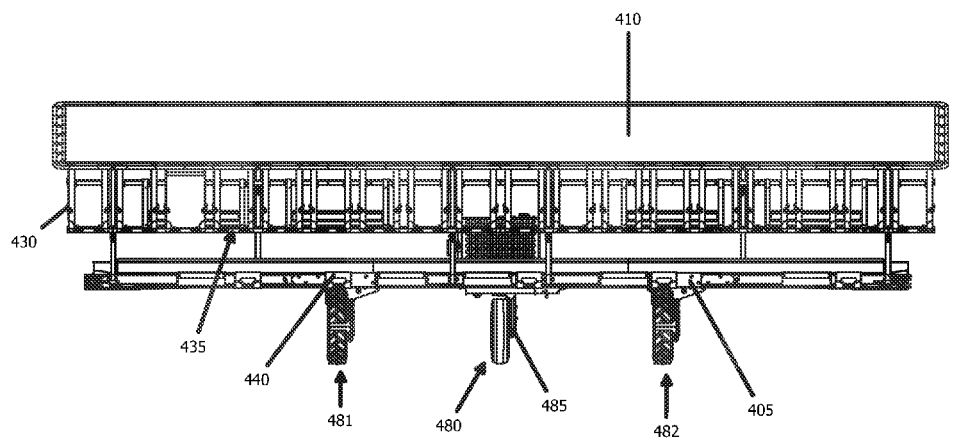
FIG. 10 is a back view of a fourth embodiment of an improved harvesting aid machine.
Figure 11:
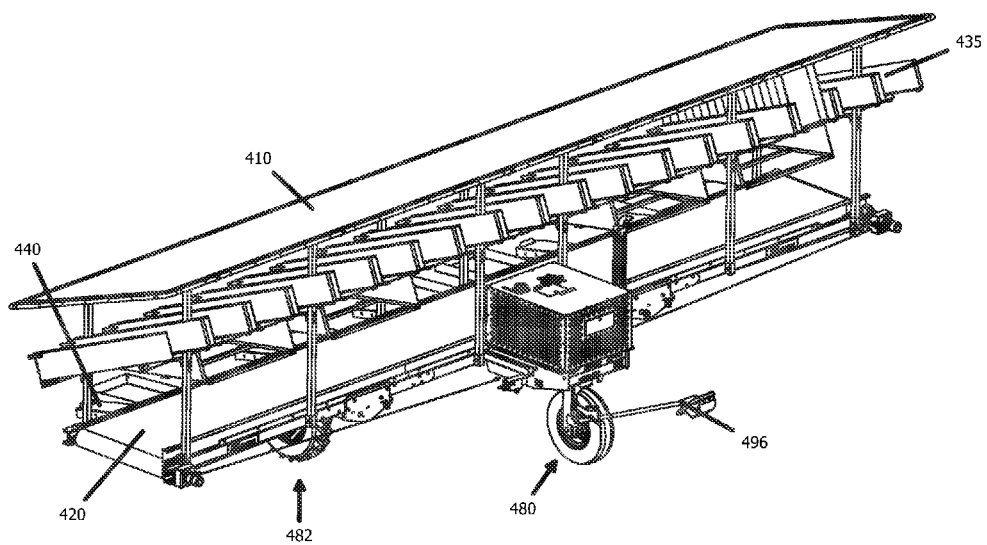
FIG. 11 is another perspective front view of a fourth embodiment of an improved harvesting aid machine.
Figure 12:
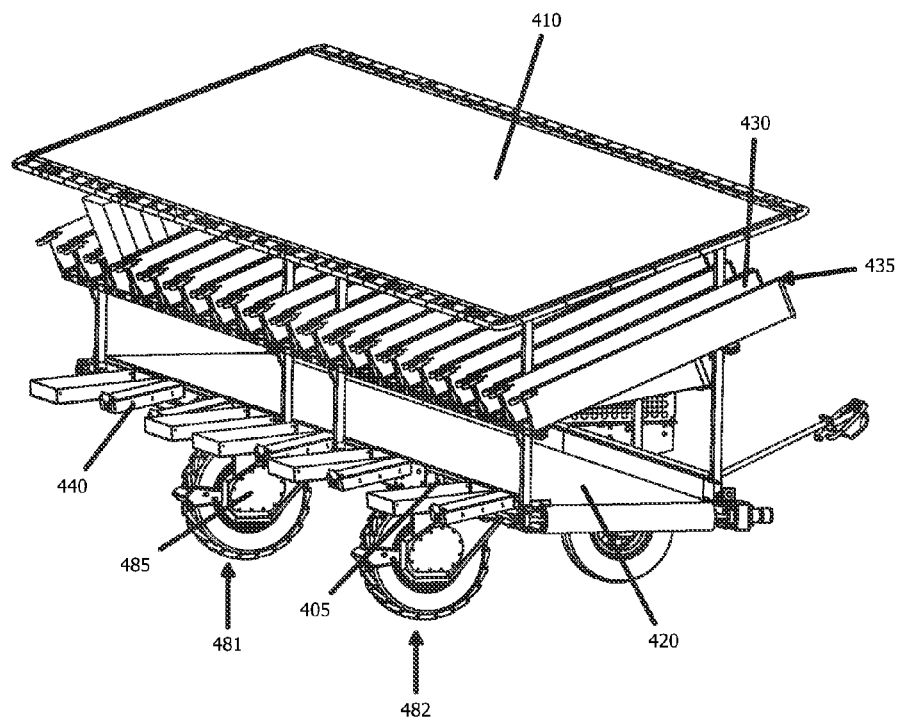
FIG. 12 is another perspective back view of a fourth embodiment of an improved harvesting aid machine.
Figure 13:
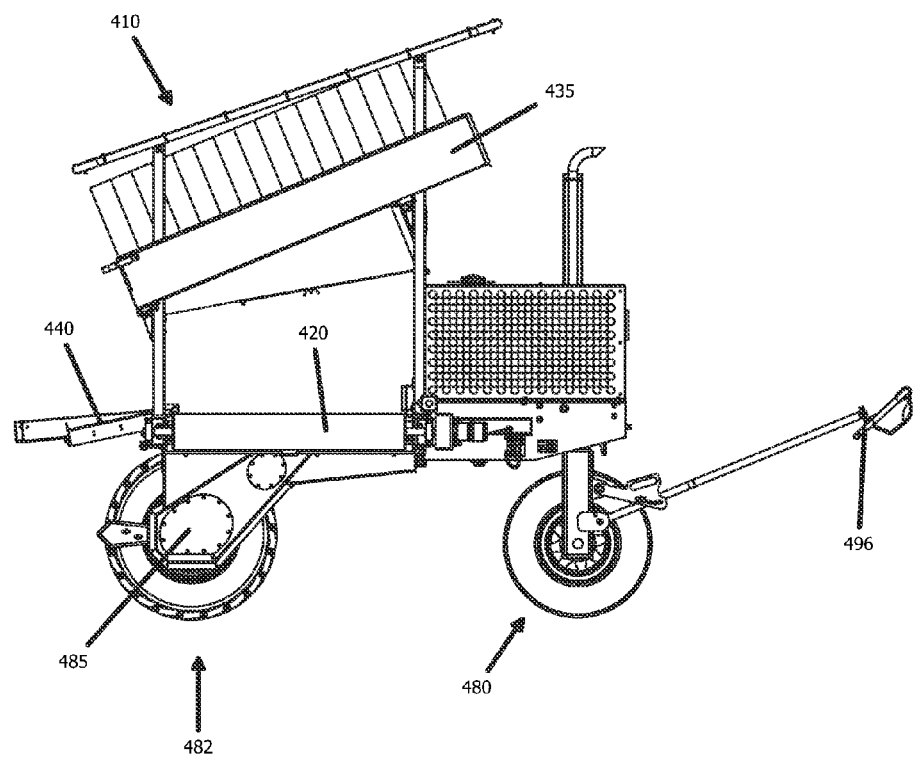
FIG. 13 is a side view of a fourth embodiment of an improved harvesting aid machine.

Additional views of the harvest aid machine 400 can be seen in FIGS. 9-13. For example, FIG. 9 is a perspective view from the top side of the harvest aid machine 400; FIG. 10 is a back view of the harvest aid machine 400; FIG. 11 is another perspective front view of the harvest aid machine 400; FIG. 12 is another perspective back view of the harvest aid machine 400 and FIG. 13 is a side view of the harvest aid machine 400. These views are provided for exemplary purposes only and are not meant to limit the spirit or scope of the present application.

In an exemplary embodiment of the present application, a three-wheel fixed width chassis design may be used, as shown in FIGS. 7-14. In this embodiment, two rear wheels are provided, respectively, by the right leg 481 and left leg 482. In an exemplary embodiment, these two wheels may be identical and the width between them can be adjusted for various furrow row widths. The two rear wheels are propelled while the third wheel which is used for steering, for example, analog control proportion steering, may be non-propelled. The front steering wheel may be provided by the front steering leg 480. In this way, the harvest aid machine 400 can be self-propelled. Single sided wheel stanchions 485 mount to the choice of points on the main chassis 405 to facilitate the multiple row widths. In an exemplary embodiment, each of the wheels line up to be placed in the field furrows to maximize the harvest picking.

The harvest aid machine 400 can be at least partially manually guided through turns, for example, when the machine reaches the end of the field crops. A row following bar 496 attached to the front steering wheel provided by the front steering leg 480 can provide for the harvest aid machine 400 to be self guided through the field. The electrical control of the rear drive motors can also allow for the harvest aid machine 400 to be self guided.

Workers may manually lift the row following bar 496 which can signal the rear wheels provided by the corresponding right leg 481 and left leg 482 to vary in speed to create a differential action. That is, the wheels prepare to make the turn. The rear wheels may counter rotate during sharp turns. That is, when the front steering wheel is steered to a 90° turn position, the inside rear wheel turns in reverse while the outside real wheel turns forward. Alternatively, or in addition to the manual guidance, automatic guidance by use of a control device (i.e., a remote control, etc.) can be provided. In one embodiment of the present application, a control device can be a microprocessor control system with integrated wireless and frequency addressing allowing for only designated remote controlled systems to control the harvest aid machine 400 by communicating with a receiver.

In a preferred embodiment of the present application, the front steering wheel may be an analog steering wheel which allows for gradual turning of the harvest aid machine 400. In this analog configuration, the speed of one of the rear wheels may be decreased, while the other wheel continuous to function at the same rate. In this way, the harvest aid machine 400 can performing an arching, gradual, slow turn.

Of course, other methods of turning the harvest aid machine 400 may be used including a discrete steering turn method, which is an incremental turning method used to perform zero-point turns.

Hydraulic oil can be carried to hydraulic wheel motors via a high pressure hose. That is, the engine 470 powers the hydraulic pump supplying oil to a load sensing hydraulic valve block control circuit. In one embodiment of the present application, hydraulic motors turn sprockets and chain in an enclosed, oil lubricated wheel stanchion 485. The hydraulic oil flow can be electronically controlled by using a hydraulic control system.

An oil catch pan 499 can be provided, for example, to catch excess oil. This oil catch pan 499 can provide greater food safety and it can prevent motor/hydraulic oils from contaminating the crops and/or fields.

The harvest aid machine 400 may be powered by engine 470 as described above. In one embodiment of the present application, the engine 470 may only be started or shut-off by an operator. However, the machine functions such as motion, direction, speed, temporary start/stop, etc. can be controlled by one or many operators and/or workers. For example, a worker in the field carrying a remote control may perform one or more of these machine functions. Additionally, one or more harvest pickers at the rear of the harvest aid machine 400 can also perform one or more of these functions by using any known control system, including using buttons located on the front side of the rear control station 490. In one embodiment of the present application, only two operators and/or stations may perform these functions. Machine motion and speed controls, etc. may also be controlled by fixed controls placed on the center of the harvest aid machine 400. Of course, other ways of performing the control functions and other combinations of control devices may be used without departing from the spirit or scope of the present application.

In one embodiment of the present application, an emergency-stop cable 495 is located outside the periphery of the harvest aid machine 400. This emergency-stop cable 495 may contain pulleys around the different areas of the cable. At one section of the emergency-stop cable 495, a switch may be located that stops or deactivates the harvest aid machine 400. In case of an emergency to a worker, the harvest aid machine 400, or to the crops, a worker may quickly deactivate the machine and prevent damage. In one embodiment of the present application, the emergency-stop cable 495 may provide an automatic means for deactivating the machine upon being tugged or pulled at a predetermined force. Of course, the emergency-stop cable 495 may be used in any other way as known in the art for purposes of safety.

Additional safety mechanisms may be provided including a backup warning alarm and a light and buzzer to indicate that an emergency stop has been triggered.

The harvest aid machine 400 can be at least partially disassembled for easier storage and/or shipment. In an exemplary embodiment of the present application, the roof 410 can be removed along with the vertical bars that attach the main chassis 405 to the roof 410. The external worker stations 440 and rear control stations 490 can be detached. According to an exemplary embodiment of the present application, the machines can be broken down and stacked to form 30 foot wide piles.

Additionally, harvest aid machine 400 may include optional storage areas for first aid kits, medical supplies, lunchbox coolers and watercoolers. Harvest aid machine 400 may further include a cable trolley inventory control system and a computerized probe for scanning employee information, such as an employee identification number. The use of a computerized probe in connection with the workers daily work routine better enables tracking of, for example, inventory and employee productivity.

The various components of the harvest aid machine 400 can be constructed of any reasonable material such as, but not limited to, aluminum, iron, steel, various metals, any combination thereof, and/or from any material from an animal source, plant source, mineral source, and synthetic source, and/or any other reasonable source.

A method of using the harvest aid machine 400 according to an exemplary embodiment will now be described herein. As illustratively depicted in FIG. 14, empty crate boxes 450 are loaded onto the designated empty crate storage stations 430 on the gravity feeding chute 435. Various methods of loading the empty crate boxes 450 may be used including attaching the transfer vehicle 500 and using the catwalk 510, as described above. Workers may load these empty crate boxes 450 on the front side of the machine while harvest workers can access the empty crate boxes 450 from the back or rear side of the machine when the boxes slide down the gravity feeding chute 435.

Next, a harvest worker collects an empty crate box 450 and carries it over to the crop field and fills the empty crate box 450 with harvested produce such as strawberries. The harvest worker may place the empty crate box 450 on top of a wheel barrel or hand cart 700 to assist in the harvest. After the empty crate box 450 has been filled, the harvest worker places the full crate box 455 on top of a designated area on the harvest aid machine 400. In an exemplary embodiment, the harvest worker may place the full crate box 455 on top of a worker station 440.

When the harvest worker has collected one or more full crate boxes 455, the worker pushes or slides the full crate box 455 onto the conveyor belt system 420. In one embodiment of the present application, the harvest worker may collect four full crate boxes 455 which make up a pallet 456 of crates before pushing the pallet 456 onto the conveyor belt system 420. This is illustratively depicted in FIG. 14.

When it is time to offload the collected pallets 456 placed on the conveyor belt system 420, a button or switch activates the hydraulic driven conveyor belt system 420. The pallets 456 laterally slide down to the edge of the harvest aid machine 400. At this point, a designated collection vehicle 600 may be placed to collect all the pallets 456. In an alternate embodiment, the pallets 456 may be transferred onto another vehicle in the field or may be placed on the ground. In one embodiment of the present application, by using the harvest aid machine 400 along with the designated collection vehicle 600, the need for workers to travel long distances back and forth to harvest the crop and deliver the filled containers to various stations is eliminated. As such, the harvest aid machine 400 can be of tremendous benefit to the harvest workers and allow them to collect the harvested crops at their own working pace and independently of the working pace of other harvest workers. In one embodiment of the present application, harvest workers are positioned between 10-50 feet behind the harvest aid machine 400 during harvest. In yet another embodiment, the need for roads placed in between the crops is reduced or eliminated.

The harvest aid machine 400 which has been powered on by control of an operator, continues to move forward along the crop field. The speed of the harvest aid machine 400 may be controlled by the operator or a harvest worker. In an exemplary embodiment of the present application, if the speed of the harvest aid machine 400 is too fast for the harvest workers to keep up with and the workers are having to travel a long distance to reach the machine, it may be determined that the speed of the machine should be slowed down. In an alternate embodiment of the present application, if the harvest aid machine 400 is moving too slowly for the harvest workers, the speed can be adjusted accordingly to speed up the harvest aid machine 400.

When the harvest aid machine 400 and the harvest workers have reached the end of a crop field and want to turn the machine to cover another patch of crops, the harvest aid machine 400 must be turned in a proper way. In one embodiment of the present application, one or more workers lift and drag the row following bar 496 of the self-powered harvest aid machine 400 and place it in the next crop location in the desired furrow. The wheels of the harvest aid machine 400 gradually move to perform the turn.

After the harvest aid machine 400 has completed turning, the process of harvesting, collecting and offloading crops continues. The operator may turn the engine off when the harvesting has ended. Of course, the harvest aid machine 400 may be temporarily or permanently controlled in a way to stop moving in case of an emergency stop.

Although the machine is described to house harvested crops such as low-lying produce crops, this machine can be utilized for various tasks. In an exemplary embodiment, the machine may be used in a field or elsewhere to collect and distribute tools, drills, etc. by using the conveyor belt system 420. Of course, other uses of the machine are possible and the examples described are not meant to limit the present application.

Now that embodiments of the present application have been shown and described in detail, various modifications and improvements thereon will become readily apparent to those skilled in the art. Accordingly, the exemplary embodiments of the application, as set forth above, are intended to be illustrative, not limiting. The spirit and scope of the present invention is to be construed broadly and limited only by the appended claims, and not by the foregoing specification.

What is claimed is:

1. A machine for harvesting crops comprising:
   a main chassis;
   an angled chute coupled to the main chassis, the angled chute adapted for holding empty containers;
   a lateral conveyor system coupled to the main chassis, the lateral conveyor system adapted for conveying crop filled containers; and
   a station adapted to hold harvested crops, wherein the angled chute extends in a direction perpendicular to a direction in which the lateral conveyor system extends and is positioned so that the empty containers are made available at a location above the lateral conveyor system.

2. The machine of claim 1 further comprising three wheels at least partially coupled to the chassis.

3. The machine of claim 2 wherein the three wheels are at least partially coupled to the chassis through respective stanchions.

4. The machine of claim 2 wherein the location of at least one of the three wheels is adjustable.

5. The machine of claim 1 further comprising a roof affixed at least in part to the main chassis.

6. The machine of claim 1 wherein the angled chute is permanently affixed to the main chassis and is non-modular.

7. The machine of claim 1 wherein the angled chute is sloped from a front of the machine to a rear of the machine such that a front-side of the angled chute of the machine is of a greater height than a rear-side of the angled chute of the machine and wherein when an empty container is loaded from the front-side of the machine into the angled chute, gravitational force assists in the placement of the empty container.

8. The machine of claim 7 wherein a pair of straps are placed at ends of the angled chute at the rear-side, the pair of straps adapted to at least partially immobilize the empty container.

9. The machine of claim 1 further comprising a station coupled to the machine, wherein the station holds a crop filled container following crop harvesting.

10. The machine of claim 1 further comprising a row following bar that is placed in a furrow of a crop field being harvested.

11. A machine for harvesting crops comprising:
    a main chassis;
    an angled chute coupled to the main chassis, the angled chute adapted to hold empty containers;
    a lateral conveyor system coupled to the main chassis, the lateral conveyor system adapted to convey crop filled crates;
    a non-propelled wheel adapted to steer the machine;
    a first propelled wheel;
    a second propelled wheel, wherein the first and second propelled wheels are controlled by a motor; and
    a station for holding harvested crops, wherein the angled chute extends in a direction perpendicular to a direction in which the lateral conveyor system extends and is positioned so that the empty crates are made available at a location above the lateral conveyor system.

12. The machine of claim 11 wherein the angled chute houses an empty container and after the container has been filled with harvested crops, the container is placed on the station.

13. The machine of claim 12 wherein the lateral conveyor system is for at least one of holding and offloading the harvested crop filled containers.

14. The machine of claim 13 further comprising a motor for providing power to at least one of the machine and the conveyor system.

15. The machine of claim 14 wherein the motor that provides power to at least one of the machine and the conveyor system is a hydraulic motor.

16. The machine of claim 14 wherein the motor is controlled locally or remotely.

17. The machine of claim 11 further comprising an emergency stop device.

18. The machine of claim 17 wherein the emergency stop device comprises a cable coupled to the machine, the cable being placed around the periphery of the machine.

19. The machine of claim 11 wherein the angled chute is sloped from a front of the machine to a rear of the machine such that a front-side of the angled chute of the machine is of a greater height than a rear-side of the angled chute of the machine and wherein when an empty container is loaded from the front-side of the machine into the angled chute, gravitational force assists in the placement of the empty container.

20. The machine of claim 11 wherein movement of the machine is controlled by at least one control device and wherein the motor is controlled by another control device.

* * * * *